United States Patent
Marggraff et al.

(10) Patent No.: US 8,719,113 B1
(45) Date of Patent: May 6, 2014

(54) SYSTEMS FOR PROVIDING SPECIALTY PRODUCT INFORMATION TO CONSUMERS

(75) Inventors: Brett Marggraff, Westerly, RI (US); Elaine Marggraff, Westerly, RI (US)

(73) Assignee: Your Advice Device, LLC, Westerly, RI (US)

( * ) Notice: Subject to any disclaimer, the term of this patent is extended or adjusted under 35 U.S.C. 154(b) by 0 days.

(21) Appl. No.: 13/422,510

(22) Filed: Mar. 16, 2012

Related U.S. Application Data (62) Division of application No. 11/191,456, filed on Jul. 28, 2005, now Pat. No. 8,150,739.

(51) Int. Cl.
*G06Q 30/00* (2012.01)
(52) U.S. Cl.
USPC ............... 705/26.64; 705/26.1; 705/26.61; 705/26.62; 705/26.63
(58) Field of Classification Search
USPC .............................. 705/26.1–27.2
See application file for complete search history.

(56) References Cited

U.S. PATENT DOCUMENTS

| | | | |
|---|---|---|---|
| 5,918,211 A | 6/1999 | Sloane | |
| 6,014,451 A | 1/2000 | Berry et al. | |
| 6,397,219 B2 | 5/2002 | Mills | |
| 6,434,530 B1 | 8/2002 | Sloane et al. | |
| 6,641,037 B2 | 11/2003 | Williams | |
| 6,807,574 B1 | 10/2004 | Partovi et al. | |
| 6,837,436 B2 | 1/2005 | Swartz et al. | |
| 6,842,767 B1 | 1/2005 | Partovi et al. | |
| 7,209,895 B2 | 4/2007 | Kundtz et al. | |
| 7,224,781 B2 | 5/2007 | Jacob et al. | |
| 7,421,285 B1 | 9/2008 | Rao et al. | |
| 7,437,344 B2 * | 10/2008 | Peyrelevade | 706/62 |
| 2001/0021935 A1 | 9/2001 | Mills | |
| 2003/0083925 A1 | 5/2003 | Weaver et al. | |
| 2003/0100337 A1 | 5/2003 | Chotkowski et al. | |
| 2005/0246223 A1 | 11/2005 | Roth et al. | |
| 2005/0247213 A1 | 11/2005 | Slilaty | |
| 2006/0265233 A1 | 11/2006 | Mundy | |

OTHER PUBLICATIONS

"OFM: Drink: On auto palate: Tim Atkin's essential guide to wine: Trying to describe what wine tastes like is just asking for an entry in Pseuds' Corner: Smells like coffee, looks like motor oil . . . it must be Shiraz." Tim Atkin. The Observer. London (UK): Mar. 14, 2004.. p. 60.*

"OFM: Drink: On auto palate: Tim Atkin's essential guide to wine: Trying to describe what wine tastes like is just asking for an entry in Pseuds' Corner: Smells like coffee, looks like motor oil . . . it must be Shiraz." Tim Atkin. The Observer. London (UK): Mar. 14, 2004, p. 60. Retrieved via Proquest on Jan. 30, 2012.

Reply to Non-final Office Action dated Feb. 8, 2011 for co-pending U.S. Appl. No. 12/037,368, filed Feb. 26, 2008. Applicants: Bret Marggraff, et al.

Non-final Office Action dated Dec. 27, 2010 for co-pending U.S. Appl. No. 12/037,353, filed Feb. 26, 2008. Applicants: Brett Marggraff, et al.

Welcome to ChoiceMaster® Downloaded from www.choicemaster.com on Jan. 10, 2008. Copyright © 1998-2007, ChoiceMaster, LLC.

(Continued)

*Primary Examiner* — Michael Misiaszek
(74) *Attorney, Agent, or Firm* — Burns & Levinson LLP; Orlando Lopez (57) ABSTRACT

Systems for storing data for access by an application program providing specialty product information to consumers.

4 Claims, 6 Drawing Sheets

(56) References Cited

OTHER PUBLICATIONS

Iverson, T. "What's in Store: Wine retailers vary vastly in selection and service. Here's a guide to some of the best ones." © The Boston Phoenix, Dec. 14-21, 2000. Retrieved from http://www.bostonphoenix.com/archive/features/00/12/14/WINE.html on Jul. 28, 2005.

\* cited by examiner

SYSTEMS FOR PROVIDING SPECIALTY PRODUCT INFORMATION TO CONSUMERS

CROSS-REFERENCE TO RELATED APPLICATIONS

This application is a divisional of co-pending U.S. patent application Ser. No. 11/191,456 filed Jul. 28, 2005 and entitled METHOD AND SYSTEMS FOR PROVIDING SPECIALTY PRODUCT INFORMATION TO CONSUMERS, which is incorporated by reference in its entirety herein for all purposes.

BACKGROUND OF THE INVENTION

This invention relates generally to method and systems for providing specialty product information to consumers.

A consumer venturing to purchase a specialty product, such as, but not limited to, wine, can face a difficult experience. As described by a Boston Phoenix journalist, "[u]nless you are already a wine expert, navigating a wine shop can be a difficult experience. So many names, so many bottles, so many sources. Although critics, advertisements, and other external sources of information can be helpful, it's hard to persuade the most wine critics to go shopping with you." (Thor Iverson, *What's In Store*, The Boston Phoenix, Dec. 14-21, 2000)

The same problem exists when purchasing specialty beers, cigars or specialty cheeses and other products.

There is, therefore, a need to provide consumer with a specialty product information at the place and time where he/she is purchasing the specialty product.

BRIEF SUMMARY OF THE INVENTION

The needs for the invention set forth above as well as further and other needs satisfied by the present invention are achieved by the embodiments of the invention described hereinbelow.

An embodiment of the method of this invention for providing specialty product information to consumers includes the steps of obtaining, in electronic form, identifying information for a specialty product of interest to a consumer, providing the identifying information to a computer system, retrieving, from a database accessible from the computer system, specialty product information related to the specialty product of interest to the consumer, and providing, to the consumer, the specialty product information.

An embodiment of the system of this invention includes an electronic components capable of obtaining identifying information for a predetermined specialty product, at least one processor, the electronic component being also capable of providing the obtained identifying information to the at least one processor, a database comprising a data structure having specialty product information correlated with the identifying information, an output device accessible to a consumer, at least one computer usable medium having computer readable code embodied therein, the computer readable code being capable of causing the at least one processor to retrieve the obtained product information from the electronic component, query the database for specialty product information related to the specialty product identified by the identifying information, obtain, from the database, the specialty product information, and provide, to the output device accessible by the consumer, the specialty product information.

For a better understanding of the present invention, together with other and further needs thereof, reference is made to the accompanying drawings and detailed description and its scope will be pointed out in the appended claims.

DETAILED DESCRIPTION OF THE INVENTION

Before describing the present invention in detail, certain terms are defined herein for the sake of clarity.

"Specialty product," as used herein, refers to a food product or any other product having such a variety, history, and a wide range of attributes such that it requires significant expertise in order to understand the range of details of the product. Examples of specialty products are, but not limited to, wines (vintage or varietal wines), specialty beers such as microbrewery or certain imported beers, cordials, cigars and cheeses.

"Specialty product information," as used herein, refers to detailed information requiring expertise in the product, such as, but not limited to, tasting notes by expert sources (such as expert opinion and treatises), similar products in a category, similar products a category but at a lower price point, information on the product such as that supplied by a critic or an expert, and the like. "Specialty product information," as used herein, should be differentiated from standard product reviews produced by nonexperts.

Figure 1A:
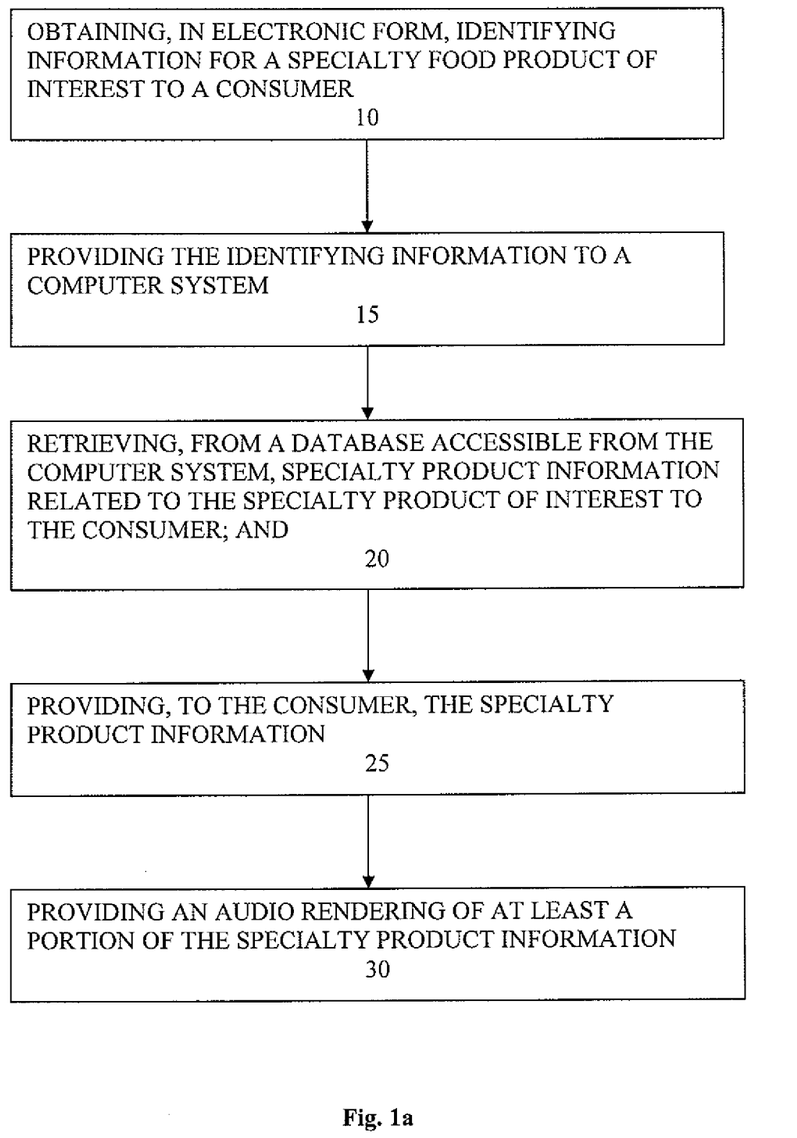
FIG. 1*a* is a flowchart of an embodiment of the method of this invention.

A flowchart of an embodiment of the method of this invention is shown in FIG. 1*a*. Referring to FIG. 1*a*, an embodiment of the method of this invention for providing specialty product information to consumers includes the steps of obtaining, in electronic form, identifying information for a specialty product of interest to a consumer (step 10, FIG. 1*a*), providing the identifying information to a computer system (step 15, FIG. 1*a*), retrieving, from a database accessible from the computer system, specialty product information related to the specialty product of interest to the consumer (step 20, FIG. 1*a*), providing, to the consumer, the specialty product information (step 25, FIG. 1*a*), and, in one instance, providing an audio rendering of at least a portion of the specialty product information (step 30, FIG. 1*a*).

Figure 2:
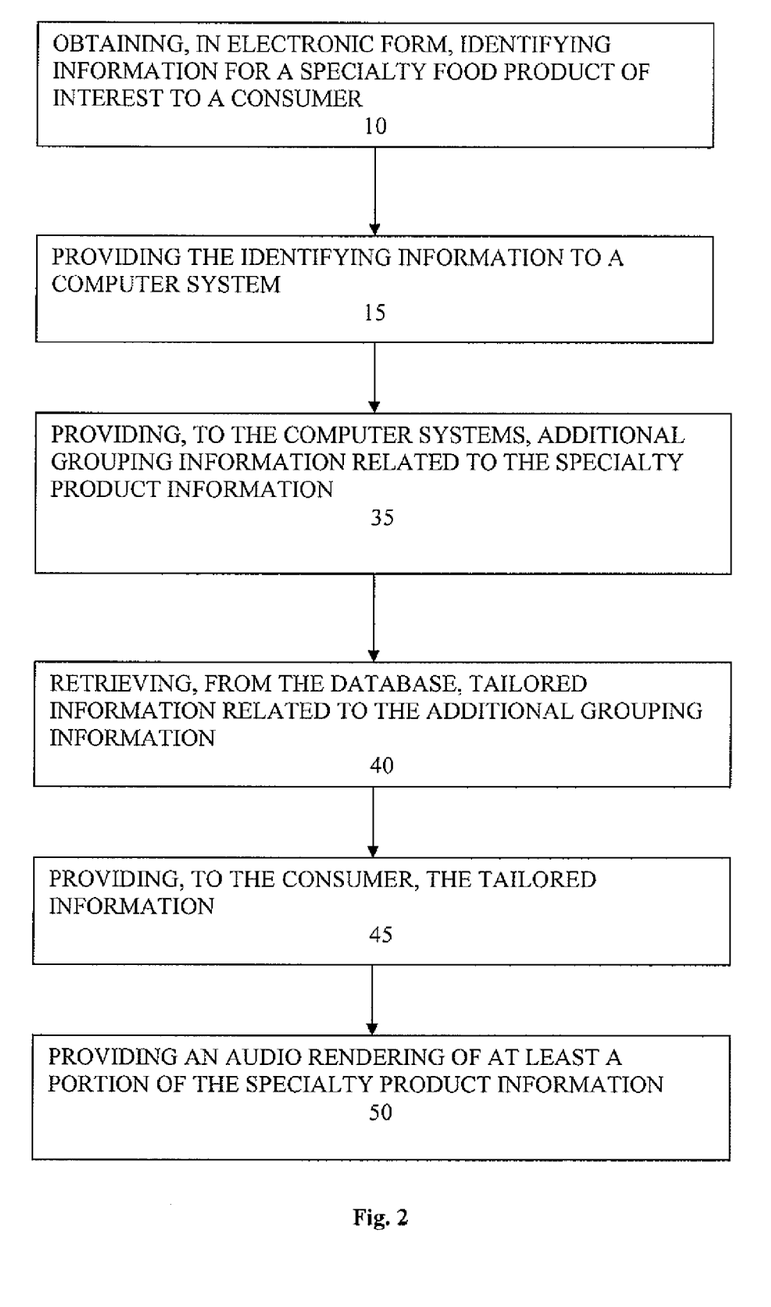
FIG. 2 is a flowchart of yet another embodiment of the method of this invention.

A flowchart representation of another embodiment of the method of this invention is shown in FIG. 2. Duplicate steps (steps that are at the same as those in FIG. 1*a*) have the same number. Referring to FIG. 2, that embodiment of the method of this invention includes the steps of obtaining, in electronic form, identifying information for a specialty product of interest to a consumer (step 10, FIG. 2), providing the identifying information to a computer system (step 15, FIG. 2), providing, to the computer system, additional grouping information related to the specialty product information (step 35, FIG. 2), retrieving, from the database, tailored information related to the additional grouping information (step 40, FIG. 2), providing, to the consumer, the tailored information (step 45, FIG. 2), and, in one instance, providing and audio rendering of at least a portion of the tailored specialty product information (step 50, FIG. 2).

In another instance, information can be transferred between the point-of-sale (POS) system and the computer system. The transfer of information provides the ability to update the database for availability and price of the specialty product.

In order to be able to accommodate specialty product items that do not have identifying information, in one embodiment, the method of this invention also includes the ability to enter or supply identifying information when it can not be obtained directly from the specialty product item. The entering of identifying information can occur while constructing the database and can be provided to the consumer in any form of a visual display (ranging from the note cards to the ability to enter the name of the specialty product).

Figure 1B:
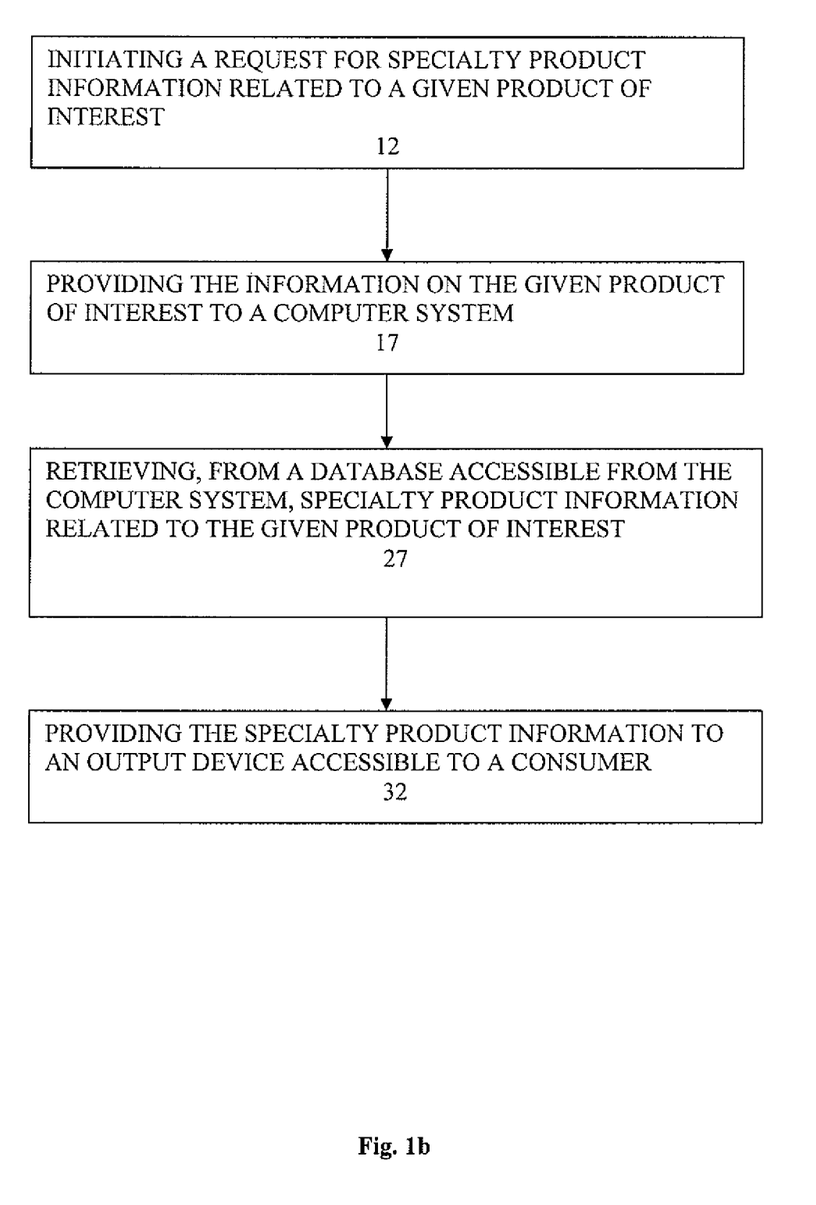
FIG. 1*b* is a flowchart of another embodiment of the method of this invention.

A further embodiment of the method of this invention is shown in FIG. 1b. Referring to FIG. 1b, an embodiment of the method of this invention for providing specialty product information related to another product of interest includes the steps of initiating a request for specialty product information related to a given product of interest (for example, but not limited to, a particular food item such as meat, or poultry, or a particular variety of cheese) (step 12, FIG. 1b), providing the information on the given product of interest to a computer system (step 17, FIG. 1b), retrieving, from a database accessible from the computer system, specialty product information related to the given product of interest (step 27, FIG. 1b), and providing the specialty product information to an output device accessible to a consumer (step 32, FIG. 1b). The output device can be a visual output device (such as, a display) or an audio output device (such as, a speaker or a group of speakers).

In one embodiment, the database of this invention includes a data structure, where the data structure (which in one embodiment can be, but is not limited to, an array) includes an identifier data element identifying a specialty product, one or more specialty product information data elements, where the specialty product information is obtained from specialized sources, such as, but not limited to, expert opinions and/or treatises, wherein the specialty product information data elements can be queried to obtain one or more relationships between the specialty product and another product. In another embodiment, the data structure also includes one or more relationships between the specialty product and another product. (There are several possible implementations of a data structure including relationships between data. In one instance, but not limited only to this instance, XML data elements can be used. See for example, US Patent Application Publication number 2002/0087571, which is incorporated by reference herein.) In one instance, the other product is another specialty product. In another instance, the other product is another consumer product.

In an illustrative embodiment of the database of this invention, the specialty product is wine and the relationship can be, in one instance, same varietal wines or wines from the same region or similar wines in the same price range. In another instance, the other consumer product is a food item such as, for example, but not limited to, prime rib, and the relationship can be wines that "go well" with that food item.

Figure 3A:
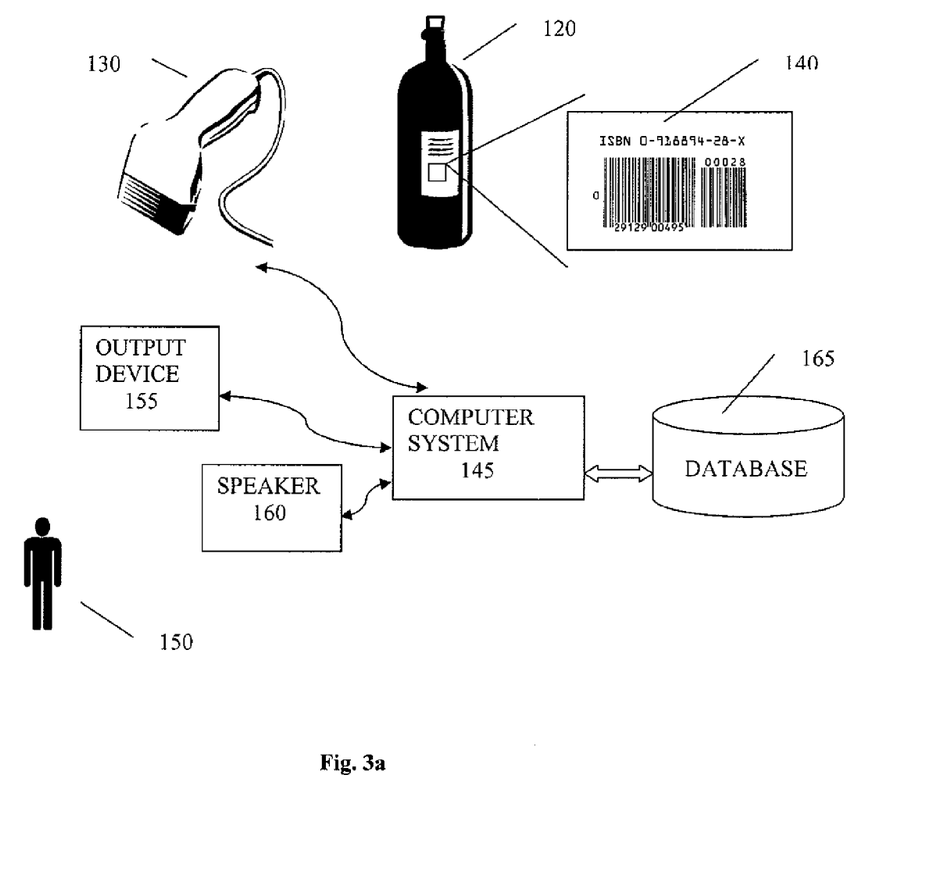
FIG. 3*a* is a pictorial schematic representation of a consumer practicing an embodiment of the method of this invention.

In order to better illustrate the methods of this invention, an illustrative embodiment is described below. It should be noted that this invention is not limited to this illustrative embodiment. A pictorial representation of a consumer practicing the illustrative embodiment of the method of this invention is shown in FIG. 3a. Referring to FIG. 3a, the specialty product in this embodiment is wine 120 and the means for obtaining in electronic form the identifying information is a wireless handheld scanner 130 (in some embodiments, a wired handheld scanner could also be used). The identifying information, in this embodiment, is a barcode 140. The consumer 150 selects a bottle of wine 120, scans the barcode 140 on the bottle of wine 120 with the wireless handheld scanner 130. The wireless handheld scanner 130 provides the barcode information to a computer system 145. The computer system accesses a database 165 and retrieves from the database 165 specialty product information related to the bottle of wine 120. The specialty product information is provided to the consumer via one or more of many possible output devices 155. The output device 155 can be, in one embodiment, a wireless display device (or a wired display device). Another display device can be, in one embodiment, a wireless speaker 160. The wireless or wired speaker can provide an audio rendering of at least a portion of the specialty product information.

In another instance, the wireless display device 155 can also have touch input capability and serve to provide to the computer system additional grouping information related to the specialty product information. In yet another instance, the handheld scanner has an audio output capability and can serve as an input/output device. In still another instance, the output device has audiovisual capabilities, for example, but not limited to, providing short video clips with sound. It should be noted that other combinations of input and output devices are within this scope of this invention.

In one embodiment, the specialty product information for wine includes a wine rating from an expert source (such as Robert Parker or the Wine Spectator), tasting reviews from an expert source (such as those previously mentioned or a magazine such as Gourmet, Bon Appétit, or Food and Wine), a description of the wine varietal, vintage, others similar wines in stock, and the like. The specialty product information can, in one embodiment, includes information from specialized books and treatises. The additional grouping information can include a request for a request for food/wine match information or wine matching a particular food category.

In one instance, the specialty product information can be relayed to the consumer's computer (computer as used herein includes devices such as, but not limited to, personal computers, laptops, PDAs, iPods and similar devices) via the Internet. In another instance, the specialty product information can be relayed to the consumer's computer via a wireless or wired connection.

The database is updated at regular intervals and at a predetermined time frame selected not to interfere with the use of the database for consumer access. The updates to the database can be performed remotely (via the Internet for example) or by means of any computer usable medium (such as, but not limited to, optical disk or tape).

Figure 3B:
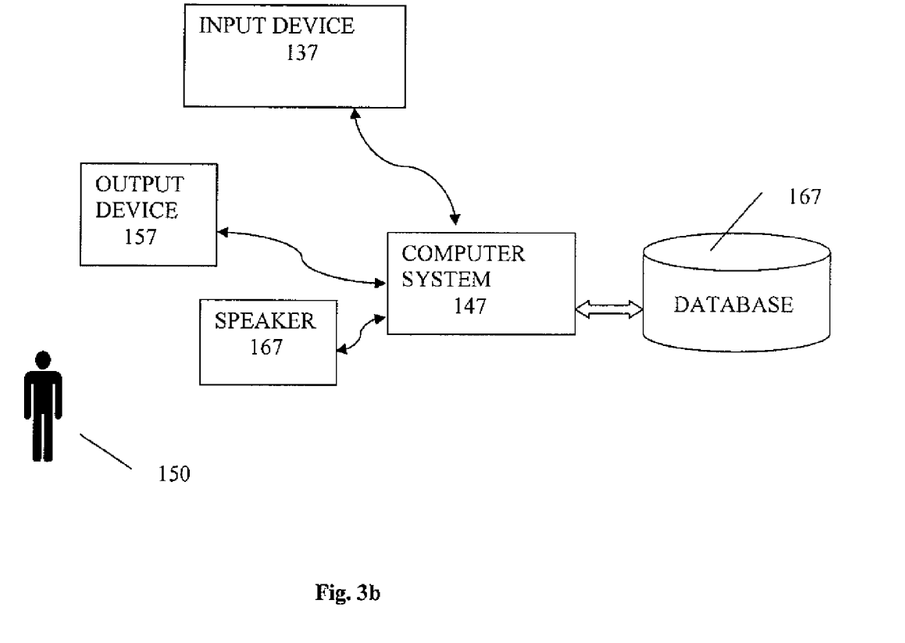
FIG. 3*b* is a pictorial schematic representation of a consumer practicing an embodiment of the method of this invention.

Another illustrative embodiment is shown in FIG. 3b. Referring to FIG. 3b, the consumer 150 initiates a request for specialty product information related to a particular product of interest. The request initiation can occur, in one embodiment, by means of an input device 137 (such as, but not limited to, a touch screen) or, in another embodiment, it can occur by means of a sensing device that senses the proximity of the consumer and initiates the request. It should be noted that this invention is not limited to only these two embodiments. The request is provided to a computer system 147. The computer system accesses a database 167 and retrieves specialty information related to the particular consumer product.

In one instance, but not limited only to this instance, the computer system retrieves information on wines that would complement a particular food item (such as, meat, poultry, cheese, etc.). The specialty product information is then provided to an output device 157 (such as, but not limited to, a display and/or a speaker or group of speakers 167). The output device 157, 167 can be wired or wireless connected to the computer system 147. In one embodiment, the computer system also provides other information of interest along with the specialty product information. (For instance, the computer systems could provide information related to the price of the particular consumer product of interest or advertisements related to the particular consumer product of interest.)

In an exemplary embodiment, provided herein to better illustrate the method and system of this invention, the database includes information related to wine. In this exemplary embodiment the database includes identifying information such as read from a barcode, the producer name (such as, for example, Robert Mondavi or Duckhorn), the type of product or varietal (such as, for example, Chadornnay, reserve), the vintage (such as, for example, 1994), the region of origin (such as, for example, Napa Valley, Calif. or Maipo Valley, Chile), awards accolades or ratings (such as, for example, Wine Spectator "highly recommended" with a rating of "95"), a full or partial review a report on the wine of interest (such as, for example, the best Mondavi reserve Chadornnay ever, this is trim and compact at first with tartly accented ripe pear), the source of information (such as, for example, Wine Spectator Apr. 30, 1997), suggested food or cheese matches (such as, for example perfect with lobster or brie cheese), pointers or correlation to food items (allowing the selection of a food item of interest and providing for the relating back to wine suggestions), pointers to related wines (allowing for the indication of for example, but not limited to, similar wines, wines in a similar price range, wines from similar is the same region). The database can also include brief descriptions of the varietal or the wine of the of the region, audio or music selections that are correlated to a particular wine or group of wines.

The system related to this exemplary embodiment includes the capability of updating or augmenting the database to include pricing or promotional information, to select the audio or music correlated to a particular wine or category of wines.

In the above exemplary embodiment, the additional grouping information related to the wines can include, but is not limited to, similar wines, wines in a similar price range, wine from a similar or the same region, suggested food items to be paired with the wine and request for brief description of the varietal or wines of the region.

In the above exemplary embodiment, a request can be sent, either directly by the consumer or initiated otherwise, for wines that can be consumed with a particular food item of interest. One such matching, for example, but not a limitation of this invention, would be, if a request is initiated for wines that match prime rib, wines in the range of $10-$15, the request would yield, for example, Clos du Bois, Merlot McManis, and Merlot Columbia Crest. In one instance, in this exemplary embodiment, the consumer can indicate the price range.

Figure 4:
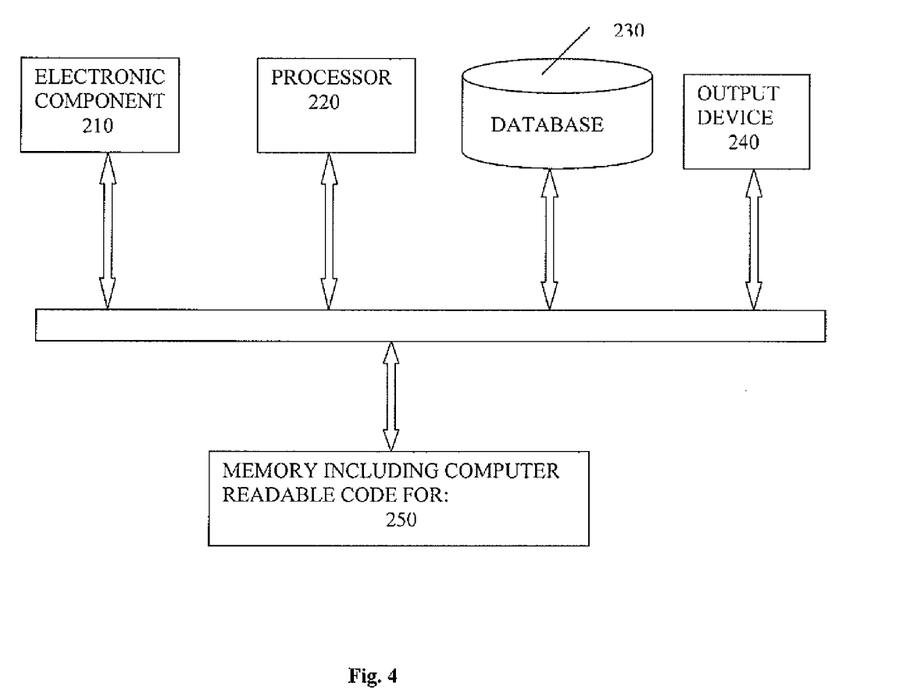
FIG. 4 is a schematic graphical representation of a block diagram of an embodiment of the system of this invention.

An embodiment of the system of this invention is shown in FIG. 4. Referring to FIG. 4, that embodiment of the system of this invention includes an electronic component 210 capable of obtaining identifying information for a predetermined specialty product, at least one processor 220, the electronic component 210 being also capable of providing the obtained identifying information to the at least one processor 220, a database 230 comprising a data structure having specialty product information correlated with the identifying information, an output device 240 accessible to a consumer, at least one computer usable medium 250 having computer readable code embodied therein, the computer readable code being capable of causing the at least one processor to execute the methods of this invention.

The electronic component 210 can, in one embodiment, be a wired or wireless handheld scanner. The wired or wireless handheld scanner can communicate to a computer system including the one or more processors 220. In another embodiment, the electronic component 210 can be a wired or wireless an input device (such as, but not limited to, a touch screen) or, in another embodiment, it can be a sensing device that senses the proximity of the consumer and initiates the input. It should be noted that this invention is not limited to these embodiments of the electronic component 210.

The computer system can be a dedicated computer system located in close proximity to the electronic component (handheld scanner) 210 or can be a distributed or remote computer system (such as a central server). The computer usable medium 250 can be any of a number of possible computer readable memories, such as, but not limited to, solid-state memories, rotating memories, either magnetic or optical, tape, or carrier wave. If the computer system is a remote system, power or signal boosters may be required.

The output device 240 may be, but is not the limited to, a display (connected either wireless or wired), an audio output device or a combination of both a display and audio output device (such as speakers). In another instance, the output device 240 may be combined with touch input capabilities in order to act as an output/input device. In yet another instance, the system can also include an input device providing the capability to input additional information, such as, but not limited to, desired consumer information, food to be matched with the specialty product such as wine, and the like.

The database 230 can be a central database in the embodiment wherein the computer system is a remote system such as a central server. In the embodiment in which there is one computer system attached to every electronic component (or to a group of electronic components), a copy of the database 230 can be located at each computer system. It should be noted that other embodiments combining or bridging the two embodiments discussed above are also within the scope of this invention. For example, the embodiment in which the computer systems, each including one or more processors, are local but several computer systems share one database is within the scope of this invention.

It should be noted that distributed computer system embodiments are also within the scope of this invention. Embodiments in which the database is located at a different location from the output device that provides the specialty product information to the consumer are within the scope of this invention. The communication between the remote database and/or server and the output device can be by wired means, by carrier wave or any other communications means.

It should be noted that, although the embodiments described herein above relate to wine or food products, the scope of this invention covers other products having such a variety, history, and a wide range of attributes such that it requires significant expertise in order to understand the range of details of the product.

Elements and components described herein may be further divided into additional components or joined together to form fewer components for performing the same functions.

Each computer program (code) within the scope of the claims below may be implemented in any programming language, such as assembly language, machine language, a high-level procedural programming language, or an object-oriented programming language. The programming language may be a compiled or interpreted programming language.

Each computer program may be implemented in a computer program product tangibly embodied in a computer-readable storage device for execution by a computer processor. Method steps of the invention may be performed by a computer processor executing a program tangibly embodied on a computer-readable medium to perform functions of the invention by operating on input and generating output.

Common forms of computer-readable or usable media include, for example, a floppy disk, a flexible disk, hard disk, magnetic tape, or any other magnetic medium, a CDROM, any other optical medium, punched cards, paper tape, any other physical medium with patterns of holes, a RAM, a PROM, and EPROM, a FLASH-EPROM, any other memory chip or cartridge, a carrier wave, or any other medium from which a computer can read.

Although the invention has been described with respect to various embodiments, it should be realized this invention is also capable of a wide variety of further and other embodiments within the spirit and scope of the appended claims.

What is claimed is:

1. A memory for storing data for access by an application program being executed on a computer system, the memory comprising:

a data structure stored in the memory, said data structure including information resident in a database used by the application program, said data structure including:
an identifier data element identifying at least one specialty product,
a plurality of specialty product information data elements related to specialty products, said specialty product information data elements being obtained from specialized sources, said specialty product information data elements comprising tasting notes by expert sources including expert opinion and treatises, similar products in a category, similar products a category but at a lower price point, information on the product such as that supplied by a critic or an expert; the data structure also including audio related to at least a portion of the specialty product information;
wherein the at least one specialty product comprises an alcoholic beverage; and wherein said specialty product information data elements can be queried to obtain at least one relationship between the specialty product and another product.

2. The memory of claim 1 wherein said at least one relationship comprises a relationship between the specialty product and another specialty product.

3. The memory of claim 1 wherein said at least one relationship comprises a relationship between the specialty product and another consumer product.

4. The memory of claim 1 wherein said data structure also includes at least one relationship between the specialty product and another product.

* * * * *

UNITED STATES PATENT AND TRADEMARK OFFICE
CERTIFICATE OF CORRECTION

| | | |
|---|---|---|
| PATENT NO. | : 8,719,113 B1 | Page 1 of 1 |
| APPLICATION NO. | : 13/422510 | |
| DATED | : May 6, 2014 | |
| INVENTOR(S) | : Brett Marggraff et al. | |

It is certified that error appears in the above-identified patent and that said Letters Patent is hereby corrected as shown below:

In the Claims:

In column 8, line 12 (claim 1), "products a category" should read -- products in a category --

Signed and Sealed this
Fifteenth Day of July, 2014

Michelle K. Lee
*Deputy Director of the United States Patent and Trademark Office*